UNITED STATES PATENT OFFICE.

JOHN T. COOKE, OF BROOKLYN, NEW YORK.

IMPROVEMENT IN COMPOUNDS FOR COATING ROASTED COFFEE.

Specification forming part of Letters Patent No. 131,852, dated October 1, 1872; reissue No. 5,383, dated April 29, 1873; application filed April 8, 1873.

*To all whom it may concern:*

Be it known that I, JOHN T. COOKE, of Brooklyn, in the county of Kings and State of New York, have invented a new and useful Improvement in Compounds for Coating Roasted Coffee; and I do declare that the following is a true and accurate description thereof.

This invention relates to certain improvements in coating roasted coffee to prevent shrinkage, to prevent the escape of the aroma, and to protect the coffee against the moisture of the atmosphere, while at the same time the materials and process are cheap, and the increase in the weight of the coffee more than compensates for the cost.

Various ingredients may be employed for this purpose; but those which my experiments have induced me to deem preferable are starch, gum arabic, and essence of coffee; and of these starch may be used separately and alone, although the result is not quite so satisfactory as when mixed with the other ingredients in about the proportions and in the manner substantially as hereinafter described.

In order to mix these ingredients together I dissolve eight ounces of starch and one ounce of the essence of coffee in boiling water, and four ounces of gum arabic in cold water. Then I mix the solutions together, and apply the same to the coffee during the operation of roasting, or immediately after the coffee has been roasted, and before it is cooled.

By applying my compound, or the starch alone, or a compound of starch and gum arabic, the coffee is protected against shrinkage and loss of aroma, its weight is increased, and, furthermore, the roasted coffee is not liable to become damp, since this compound forms a coat on each bean which effectually excludes moisture.

I find that a solution of starch and boiling-water will, to a certain extent, effect the desired object, but not so thoroughly as though a solution of gum arabic is added thereto; and I also find that the addition of the essence of coffee still further improves the effect, and thoroughly produces the desired end.

I am aware that many experiments have been made to coat roasted coffee; for instance, sugar has been used and recommended for this purpose by Professor Liebig in Germany, for more than twenty years past. Eggs have have also been used for this purpose for more than thirty years, to my knowledge. The disadvantage of sugar, however, is, that this substance is hydroscopic—that is to say, it attracts moisture from the atmosphere, and the coffee coated with sugar is liable to become damp. The gelatinous matter contained in the eggs produces a good protective coat for the coffee; but the eggs are generally too expensive to be used with economy for coating coffee.

I do not claim, broadly, as my invention a compound for coating roasted coffee containing glutinous or gelatinous matter, since such is shown in John Arbuckle's patent of January 21, 1868; but What I do claim as new, and desire to secure by Letters Patent, is—

1. Starch when used for coating coffee, substantially as and for the purposes set forth.

2. A compound of starch and gum arabic mixed together, substantially in the manner and proportions, and for the purposes specified.

3. A compound made of starch, gum arabic, and essence of coffee mixed together, substantially in the manner and proportions, and for the purposes described.

JOHN T. COOKE.

Witnesses:

H. F. SPRAGUE,

H. F. EBERTS.